United States Patent [19]
Bartley et al.

[11] 3,746,590
[45] July 17, 1973

[54] METHOD OF MAKING A PNEUMATIC TIRE HAVING A BELT WOUND FROM A TAPE

[75] Inventors: Donald R. Bartley, Cuyahoga Falls; James Sidles, West Richfield, both of Ohio

[73] Assignee: The B. F. Goodrich Company, New York, N.Y.

[22] Filed: Oct. 26, 1970

[21] Appl. No.: 83,748

Related U.S. Application Data

[62] Division of Ser. No. 693,993, Dec. 27, 1967, Pat. No. 3,550,667.

[52] U.S. Cl. .................. 156/117, 156/128, 156/287
[51] Int. Cl. ............................................. B29h 17/10
[58] Field of Search ................................ 152/361 R; 156/110 C, 117, 128 R, 130, 133, 287, 397

[56] References Cited
UNITED STATES PATENTS

| | | |
|---|---|---|
| 2,982,327 | 5/1961 | Vanzo et al. .................... 152/361 |
| 2,352,055 | 6/1944 | Witt .................................. 156/397 |
| 3,002,874 | 10/1961 | Lowe ................................ 156/397 |
| 3,433,689 | 3/1969 | Marzocchi et al. ............. 156/130 X |

FOREIGN PATENTS OR APPLICATIONS

| 1,447 | 0/1913 | Great Britain ..................... 156/397 |
|---|---|---|

Primary Examiner—Stephen C. Bentley
Attorney—W. A. Shira, Jr. and Joseph Januszkiewicz

[57] ABSTRACT

A method of making a tire of the type having radially disposed reinforcing cords in the carcass and a restrictive belt or girdle superposed thereon, characterized by the belt or girdle being formed as a circumferentially continuously wound strip of parallel cords disposed in a plurality of sinusoidal windings alternately tangent to opposite axial edges of the belt.

2 Claims, 2 Drawing Figures

PATENTED JUL 17 1973

INVENTORS
DONALD R. BARTLEY
JAMES SIDLES

W. A. Shira Jr.
ATTY.

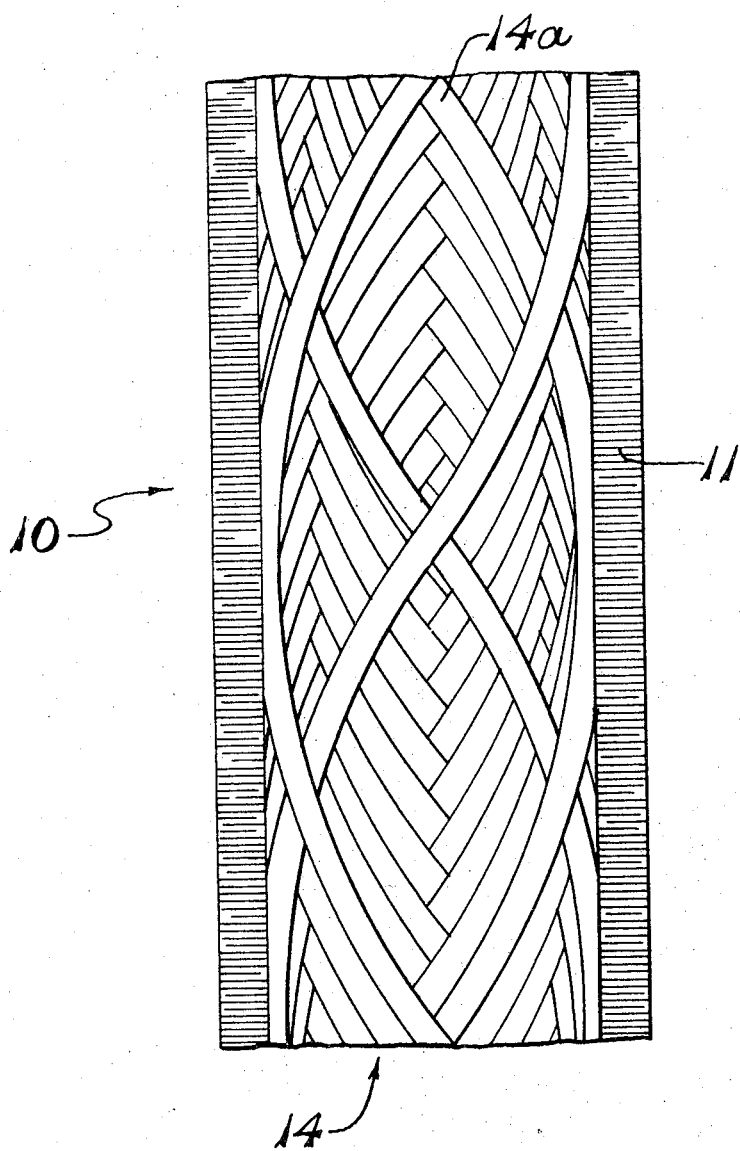

METHOD OF MAKING A PNEUMATIC TIRE HAVING A BELT WOUND FROM A TAPE

CROSS REFERENCE TO RELATED APPLICATIONS

The present application is a division of our copending U.S. patent application Ser. No. 693,993, filed Dec. 27, 1967, entitled "Pneumatic Tire", which issued Dec. 29, 1970 as U.S. Pat. No. 3,550,667.

BACKGROUND OF THE INVENTION

In the manufacture of radial cord tires, the present commonly employed practice is to assemble the carcass, including the beads, the carcass ply or plies of radially disposed cords, and the elastomer covers for the sidewalls, in flat band form on a collapsible building drum. The drum is then collapsed internally, the carcass is removed from the drum and expanded to a generally toroidal form for application of the restrictive belt or girdle and the tread stock. The completely assembled tire is then vulcanized in a mold.

The assembly of the restrictive belt onto the carcass has been the focal point of numerous difficulties in manufacturing radial tires. Thus, it is extremely difficult to expand the carcass to toroidal shape without serious cord distortion when super-imposed bias angle plies of inextensible cords are placed over the radial plies in flat band form. This is because the bias angle plies are of low angle or nearly perpendicular to the radial ply or plies and there is great resistance to the necessary pantographing action of the bias angle plies as the carcass is shaped. Therefore, it has been common practice in manufacturing radial cord tires to expand the carcass of radial plies to inflated configuration before applying the reinforcing plies constituting the restrictive belt. This procedure requires more time and equipment than needed for complete flat band building of the tire. Moreover, the axial curvature of the inflated carcass and the need for precise centering of the reinforcing belt on the carcass, have added to the difficulties and expense of manufacturing radial tires.

In addition to the above-mentioned difficulties of building radial-type tires, the customary belt or girdle thereon is formed of layers each having a plurality of separate, parallel cords the many ends of which must be covered or folded inwardly of the edges of the belt to prevent separations from occurring in the shoulder regions of the tire. This further slows production and adds to the cost of the radial tires.

SUMMARY OF THE INVENTION

The present invention solves the above-described problem by the provision of an improved method of forming the belt for restricting and reinforcing the crown region of the carcass of a radial cord tire such that the belt may be more easily constructed and simultaneously assembled onto an expanded carcass thereby reducing the cost of manufacture.

The belt is formed in the presently preferred method, by continuously winding a tape of parallel cords covered by uncured elastomer, circumferentially over the crown of an expanded radial ply carcass in a sinusoidal pattern, with the tape alternately tangent to opposite axial edges of the belt. During the winding, the points of tangency of the tape with the edge of the belt are circumferentially indexed, in consecutive layers of windings, and the winding is continued until the crown of the tire is covered by overlapping portions of the tape and the circumferential edges of the belt are defined by a plurality of closedly spaced, tangentially disposed tape overlays. These successive layers of tangentially disposed windings at the edge of the belt provide additional reinforcement to the tread "shoulder" area of the tire. While the belt is preferably wound directly upon the toroidally shaped carcass, the nature of the belt provides an improvement in the ease and precision with which the belt may be constructed if the belt is to be wound separately for subsequent assembly on a radial cord carcass.

BRIEF DESCRIPTION OF THE DRAWINGS

FIG. 2 is a fragmentary plan view of the central portion of the tire carcass shown in FIG. 1 with the tread removed, showing in detail the tape-wound reinforcing belt.

DETAILED DESCRIPTION

Figure 1:
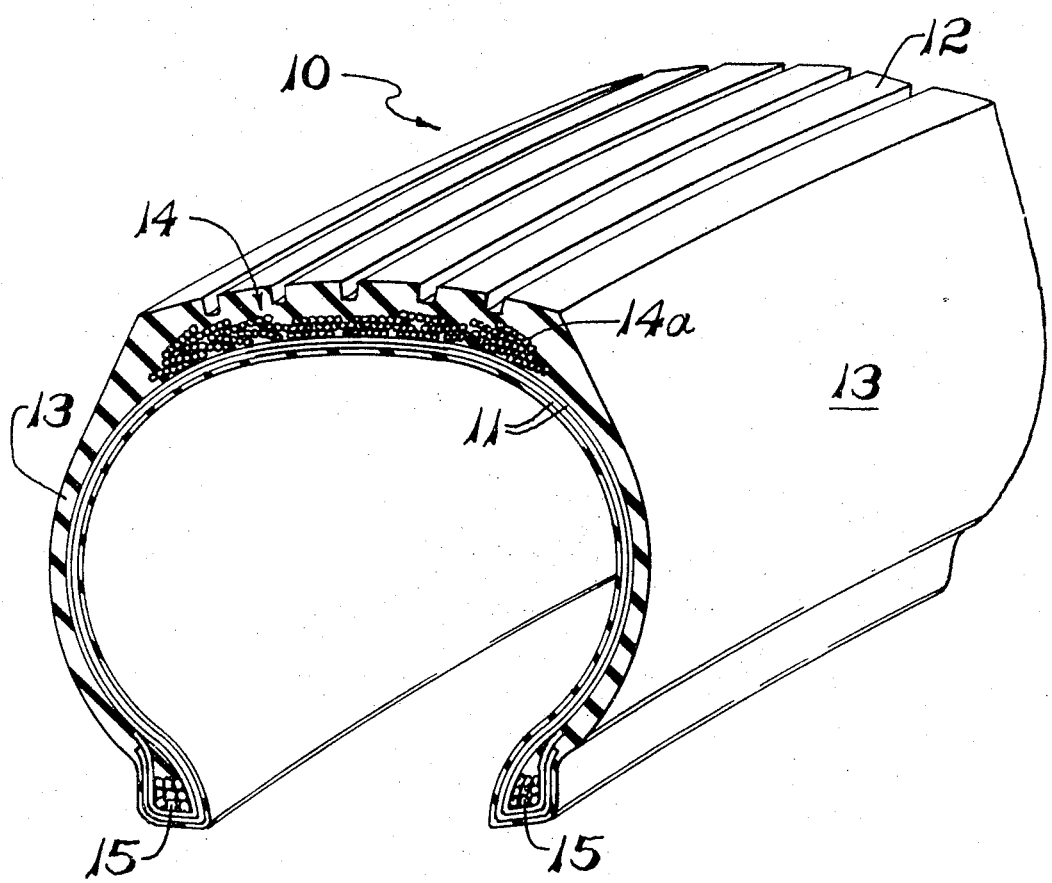
FIG. 1 is a perspective view of a portion of a vulcanized pneumatic tire incorporating this invention.

Referring first to FIG. 1, the tire 10 is shown as comprising a carcass of at least one, and preferably two, layers of radial cord reinforcing plies 11, each ply extending continuously to the spaced bead cores 15 about which the edges of the plies 11 are turned in the conventional manner. The carcass is covered by elastomeric material constituting the usual tread 12 and sidewall covers 13. A tread-reinforcing and carcass-restricting belt or girdle 14 is positioned circumferentially over the crown of the carcass between the latter and the tread.

The belt or girdle 14 is, in accordance with this invention, formed by continuously winding a tape-like strip 14a, of parallel cords covered with uncured elastomer in a plurality of overlaying generally sinusoidal, windings to form a continuous layer of reinforcing cord extending at low angles to the circumferential center line of the tire. As shown in FIG. 2 in the preferred form of the invention, the tape 14a is so wound that the regions of change of direction thereof are alternately tangent to lines forming the opposite axial edges of the belt 14. The points of tangency to the edges in adjacent superposed layers of windings are indexed circumferentially so that the edges of the belt are formed solely by cords substantially tangentially disposed to the circumference of the belt edge, thereby resisting, in direct tension, loads imposed by expansion of the tire under inflation pressure. Furthermore, the successive superposed windings forming the edges of the belt 14 provide a build-up or greater thickness of cords for the "shoulder" or edge portion of the tread thus affording additional reinforcement in this region. This tends to stiffen the tread to resist distortion from forces axially imposed on the tire by the loads transmitted from the moving vehicle.

The tape wound belt may be first wound on a cylindrical form and then transferred to the carcass. Preferably, however, the carcass including the radial ply or plies 11, bead cores 15 and sidewall covers 13 are assembled in flat band form in the conventional manner. This carcass is then shaped to a toroidal configuration and is rotated about its axis while oscillating about an axis at right angles thereto, while a tape of elastomer-covered cords is applied to the crown region of the carcass. The ratio of rotation and oscillation is such that the tape is disposed in a sinusoidal arrangement with successive revolutions of the carcass resulting in circumferential indexing of the regions of reversal of direction of the tape. The winding is continued until the crown region of the tire is covered by at least two layers of cords. When the winding is complete, the tire is provided with elastomer for forming the tread, removed from the winding station and vulcanized in a suitable mold.

In the presently preferred form of the invention, as shown in FIGS. 1 and 2, the tape 14a formed of substantially inextensible cords disposed in parallel planar relationship with the cords extending longitudinally of the tape and surrounded by elastomer for winding tires of passenger and truck sizes is preferably approximately 7/8 inches wide. However, the invention is not limited to use of tape of this width and the tape may be made any width convenient and suitable for winding which has been found to be in the range 3/8 to 1 inch. Preferably the tape should have 10 to 20 cords per inch of width. The half-period of the sinusoidal arrangement of the tape preferably subtends a central angle of 30°–90° of the circumference of the tire but not greater than 120° of the circumference of the tire.

An important advantage of the present method of making a belt is that the method enables easier fabrication of the belt having no cut ends of cords extending to the axial edges thereof, as is the case for conventional bias-angle laid plies in a reinforcing belt where the axial edges thereof are not folded over. Since there are no cut ends extending from the belt 14, good adhesion and reduction of separation between the belt 14, the adjacent elastomer, and the radial cord carcass are provided. This is in contrast to the case of tires having unfolded bias-angle plies in the belt in which tire separations are sometimes experienced at the axial edge region of the belt.

Persons having ordinary skill in the art will be able to make modifications and adaptations of the disclosed embodiment within the purview of the invention which is more particularly defined in the appended claims.

We claim:

1. The method of making a pneumatic tire comprising:
   a. providing a carcass of at least one ply of radially extending cords, and axially spaced beads in a substantially toroidal configuration;
   b. superposing on the crown region of said carcass a tread reinforcing belt wound from a tape comprising a plurality of parallel cords covered with elastomeric material, the said tape
      1. having a width substantially less than the width of the belt,
      2. being disposed in a plurality of sinusoidal windings such that each change of direction of the tape winding is effected in a flat curve at an edge of the belt with the tape disposed tangentially to the adjacent belt edge, and
      3. the half period of the sinusoidal winding being not less than one-twelfth nor more than one-third of the circumference of the complete tire;
   c. applying uncured elastomeric material over said belt and carcass to form a tread and sidewalls; and,
   d. vulcanizing the tire in a mold.

2. The method of making a pneumatic tire comprising:
   a. providing a carcass of at least one ply of radially extending cords and axially spaced beads in a substantially toroidal configuration;
   b. rotating said carcass about its axis and simultaneously oscillating the carcass about an axis at right angles to the axis;
   c. winding on the crown of said rotating and oscillating carcass a tape of elastomer covered cords, which tape has a width less than the lateral extent of said crown, the winding being effected in unfolded overlapping sinusoidal configuration thereby forming a continuous band with each reversal of direction of the tape tangent to an edge of the band and with the half period of the sinusoidal winding being not less than one-twelflh nor more than one-third of the circumference of the complete tire;
   d. applying tread-forming elastomer over the said band; and
   e. vulcanizing the tire.

* * * * *